July 26, 1960
G. COHEN DE LARA ET AL
2,946,667
APPARATUS FOR CONTROLLING THE RATE OF DISCHARGE
OF MATERIALS THROUGH AN OUTLET
Filed June 3, 1958
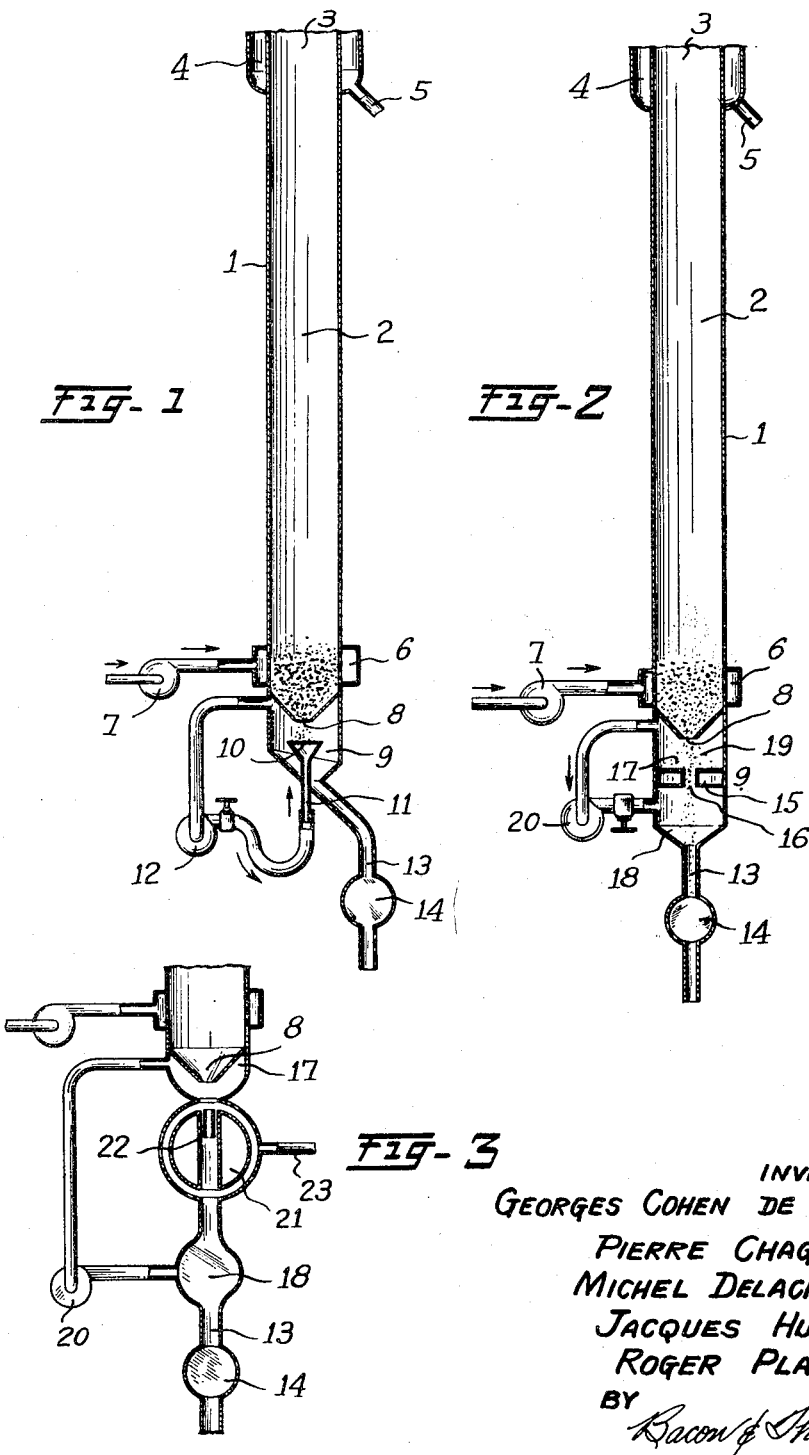
INVENTORS
GEORGES COHEN DE LARA
PIERRE CHAGNON
MICHEL DELACHANAL
JACQUES HURÉ
ROGER PLATZER
BY
Bacon & Thomas
ATTORNEYS United States Patent Office 2,946,667
Patented July 26, 1960

2,946,667

APPARATUS FOR CONTROLLING THE RATE OF DISCHARGE OF MATERIALS THROUGH AN OUTLET

Georges Cohen de Lara, Grenoble, Pierre Chagnon, Villeneuve Saint Georges, Michel Delachanal, Grenoble, Jacques Huré, Fontenay aux Roses, and Roger Platzer, Chatillon sous Bagneux, France, assignors to Etablissement Public: Commissariat a l'Energie Atomique, Paris, France Filed June 3, 1958, Ser. No. 739,486

5 Claims. (Cl. 23—270)

This invention relates to apparatus for continuously controlling the rate of discharge of divided solid materials and the like, by gravity, through a discharge outlet. The invention is especially though not exclusively concerned with such control of the rate of discharge of divided solid materials out of a chemical processing apparatus in which the materials are treated with a liquid in counterflow relation.

Liquid-solid counterflow treating apparatus usually comprise a vertical column-like enclosure defining a treating zone, with the raw solid materials to be treated being introduced into said zone through a solids inlet at the top of the column while the treating liquid is introduced into the zone by way of a liquid inlet connection near the bottom of the column. The spent liquid is discharged from the top of the column, after having risen through it in counterflow relation with the descending solids; the treated solids are withdrawn by gravity from the base of the column through a solids outlet.

In conventional apparatus of this type the withdrawal of the solid materials by gravity through the bottom outlet is generally effected batchwise, as by intermittent opening of a valve. As a consequence the downflow of the solid materials through the treating zone must also be intermittent in character, thereby detracting from the general efficiency and economy of an otherwise continuous process.

It is accordingly an obect of this invention to provide means for a continuous, rather than an intermittent, withdrawal of divided solids and similar materials through the base outlet of a processing apparatus. Another object is to provide improved means for controlling the rate of discharge of solid materials by gravity through an outlet in a more precise, flexible and convenient manner than any means heretofore available, and specifically for effecting such control by controlling the flow rate of a liquid; it is also an object to provide improved continuous apparatus for the counterflow processing of liquids and solids in a treating zone.

An arrangement according to the invention for continuously controlling the rate of discharge of solid materials by gravity through an outlet, comprises a liquid-filled enclosure underlying said outlet, and means for creating an upward flow of liquid through said enclosure for controllably opposing the downward discharge of said solid materials.

Thus, in processing apparatus having a bottom outlet through which processed solid materials are adapted to be discharged by gravity, the invention may provide a liquid-filled enclosure underlying the outlet, a perforate surface in the enclosure at a predetermined spacing from the outlet, the effective area of said perforate surface and the spacing thereof from the outlet being so proportioned that the materials discharged from the outlet tend to settle and build up in a heap upon said surface reaching up to said outlet thereby tending to stop the discharge therethrough, and means for delivering an upward stream of fluid through the perforate surface at a controllable rate to control the size of said heap and hence the rate of discharge of the materials through the outlet.

The perforate surface may take the form of a perforate plate wherein the perforations are dimensioned small enough to prevent passage of the materials therethrough, so that the discharged solid materials tend to build up a solid heap on said plate, the top of which heap will completely stop the discharge if permitted to reach up to the outlet, and the stream of fluid delivered upwards through the plate perforations acts continually to undermine said heap so that the sides of the heap are continuously crumbling at a rate proportionate with the rate at which the fluid is discharged, whereby the rate of fluid delivery effectively controls the size of the heap and therefore the degree to which the heap stops the outlet, and thus controls the rate of discharge of the solid materials. The solid materials crumbling from the sides of the heap and over the sides of the perforate plate may then be continually collected in any suitable receiving means.

According to an alternative form of the invention, the perforate surface may assume the form of an orificed plate wherein the orifice is so calibrated as to allow of a restricted passage of said materials therethrough, so that the discharged solid materials tend to build up in a heap on said surface which heap tends to collapse in its centre, and which heap if allowed to build up to a sufficient height will tend to stop the discharge of solids through said outlet, and the stream of fluid delivered upwards through the orifice acts to oppose such collapse and thus again permits control of the size of the heap and the rate of solids discharge through the outlet. In this arrangement means would be provided for continuously collecting the solids falling through the orifice in the surface.

It may be noted that the two arrangements just described are reverse in character to the extent that in the first case an increase in the rate of fluid delivery will result in an increase in the rate of solids discharge, whereas in the second instance an increase in fluid delivery will slow down the rate of discharge of the solids. In both cases however the control of the solids discharge rate is exerted by a control of the rate of flow of a stream of fluid delivered in opposition to said discharge. Hence in both cases the advantages of flexibility and accuracy characteristic of fluid flow regulation are achieved in connection with the continuous control of flow of solid materials.

Exemplary embodiments of the invention will now be described by way of illustration with reference to the accompanying drawings, wherein:

Fig. 1 is a diagrammatic view in axial vertical section of chemical processing apparatus arranged in accordance with the invention;

Fig. 2 is a similar showing of another embodiment of the invention;

Fig. 3 is a detail view relating to a modification of Fig. 2.

Referring to Figs. 1 and 2, apparatus according to either of the two embodiments shown in those figures comprises a vertical tubular column 1 the major extent of which defines a treating zone 2. Granular solid material is introduced from the top of the column through a top solids inlet 3. This top inlet is surrounded by an annular trough 4 provided with a discharge pipe 5. At the base of the treating zone 2 liquid inlet means are provided in the form of an annular surrounding jacket 6 connected to the outlet of a pump 7. It will be understood that the treating liquid from pump 7, the inlet of which is connected to a suitable source of said liquid, flows up through the treating zone 2 in counterflow relation to the descending solids, and that the liquid then overflows into the discharge trough 4. The treated solids at the base of the treating zone are discharged by way of a funnel outlet 8, into a liquid-filled enclosure 9.

Referring now more particularly to the embodiment of Fig. 1, the particles of solid material from funnel outlet 8 drop into a perforate plate 10, underlying said outlet and build up into a heap on said plate. The plate 10 forms the top of the enlarged end portion of a pipe 11 which extends downwardly out of the intermediate zone 9 and is connected with the discharge side of a pump 12. This pump has its inlet connected as shown with a point near the top of the enclosure 9. Thus, treating liquid drawn off out of the enclosure 9 is delivered by the pump 12 up through the perforations in the plate 10. The upward jets of liquid thus discharged under substantial pressure through the plate 10 and into the base of the heap of solid material on the plate, result in causing a continuous and gradual sinking and collapse of the sides of the heap, which in turn permits a continuous and progressive introduction of additional solid material from the outlet 8 at a corresponding rate. The solid particles settling on to the plate 10 along the sides of the heap fall off the plate and into the funnel-shaped bottom of the enclosure 9, and through the bottom outlet of it into a discharge line 13 having a suitable discharge valve 14.

In the embodiment shown in Fig. 2, the general arrangement is the same and corresponding parts are designated by the same reference numerals. However, in this embodiment a horizontal wall 15 is provided across the enclosure 9 and is formed with an axial orifice 16 of calibrated section which thus divides the zone 9 into an upper compartment 17 and a lower 18. The solid particles issuing from the bottom outlet 8 of the treating zone clog up the orifice in the wall 15 and build up on said wall to provide a heap 19 the base of which at all times tends to collapse through the orifice 16 into the under compartment 18. A continuous rising flow of liquid is maintained through orifice 16 by means of the pump 20 having its inlet connected to the top of compartment 17 and its outlet discharging into the lower compartment 18, at a controlled rate. Thus the solid particles drop through orifice 16 into compartment 18 whence they are discharged in the same way as in Fig. 1.

It will be noted that in the embodiment of Fig. 1, in contrast with what occurs in Fig. 1, the rate of flow of the solids decreases when the rate of liquid flow up through orifice 16 is increased, and vice versa. Depending on the particular operating conditions, one or the other of the two arrangements may prove more convenient.

Fig. 3 illustrates a modification of the embodiment shown in Fig. 2. Herein, a valve 21 is provided instead of the perforate wall 15 separating the compartments 17 and 18. The valve includes a replaceable, calibrated nozzle 22 equivalent in function to the calibrated orifice 16 in Fig. 2. A conduit 23 connects with the side of the body of valve 21 whereby the nozzle 22 can be changed without destroying the chemical equilibrium within the treating column. Further, the valve 21 is rotatable for completely stopping the flow of solids if required.

It will be noted that in all embodiments of the invention described the fluid serving to regulate the rate of discharge of the solids may be the same as the treating fluid in the treating zone of the column. Thus there are two fluid flow circuits in the complete system which may partly or completely overlap. That is, a pumping unit may serve to withdraw part or all of the fluid in the main flow circuit flowing through the treating zone and transfer it into the secondary circuit serving to regulate the solid discharge rate. In this way adjustment of the rate of delivery of said pumping unit may serve to determine the rate of discharge of the solids from the system.

It should be understood however that the invention may be embodied in types of system other than those wherein solid materials are processed with a treating liquid, and in such case of course the fluid flow circuit for controlling the rate of solids discharge would be an independent one. Any suitable fluid, not necessarily liquid, e.g. air, may be used.

The term "solid" as used herein and in the claims should be understood as including both divided solids such as granular and pulverulent materials, and also semi-solid materials such as pulp or paste.

What we claim is:

1. Apparatus for controlling the rate of flow of solid materials continuously circulated in a liquid-solid counterflow treating column, wherein the solid materials are introduced at the top of the treating zone portion of said column and withdrawn at the bottom thereof, with a liquid circulating in said column portion in counterflow relation, said apparatus comprising: an enclosure positioned below said column portion, said enclosure and said treating zone being in communication through at least one orifice at the bottom end of said column portion for the flow of solids into said enclosure, said enclosure being provided with an outlet for the removal of said solids; a horizontal wall positioned in said enclosure in spaced relation below said orifice and in the path of said flow of solids, said wall being positioned to accumulate solids thereon to the extent of blocking said orifice and being provided with at least one aperture therethrough; and means for delivering a controlled flow of liquid through said aperture in the direction of said orifice to thereby oppose the flow of solids, whereby the amount of liquid flow determines the extent of accumulation of solids above said wall.

2. The apparatus of claim 1 wherein a liquid outlet is provided in said enclosure above the level of said aperture and wherein means are provided for the recirculation of liquid from said liquid outlet for delivery through said aperture.

3. The apparatus of claim 1 wherein said wall comprises a perforate plate aligned with said orifice and wherein said liquid is delivered through apertures in said plate and tends to limit the extent of solids accumulating thereon.

4. The apparatus of claim 1 wherein said aperture comprises a calibrated restriction underlying said orifice and wherein said liquid is introduced into said enclosure below said wall for upward flow through said aperture to limit the downward flow of solids through said aperture.

5. The apparatus of claim 4 wherein said calibrated aperture is provided by a rotatable valve element having a removable calibrated orifice member therein.

References Cited in the file of this patent

UNITED STATES PATENTS

| 806,414 | Krause | Dec. 5, 1905 |
| 2,316,814 | Schemm | Apr. 20, 1943 |
| 2,696,304 | Gilmore | Dec. 7, 1954 |